March 19, 1968  T. CAMPAGNOLO  3,373,845
HIGH PERFORMANCE FRICTION DISC BRAKE
Filed Sept. 7, 1965  3 Sheets-Sheet 3
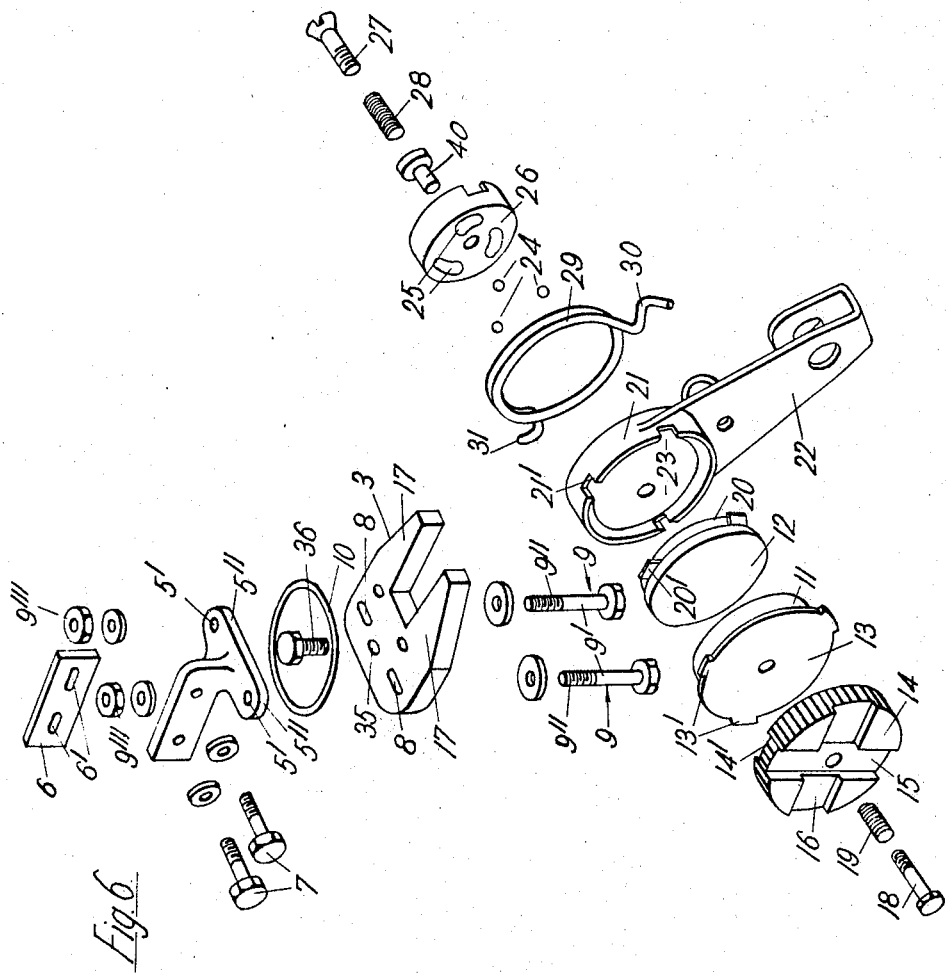
Inventor
Tullio CAMPAGNOLO
By
Attorney United States Patent Office 3,373,845
Patented Mar. 19, 1968

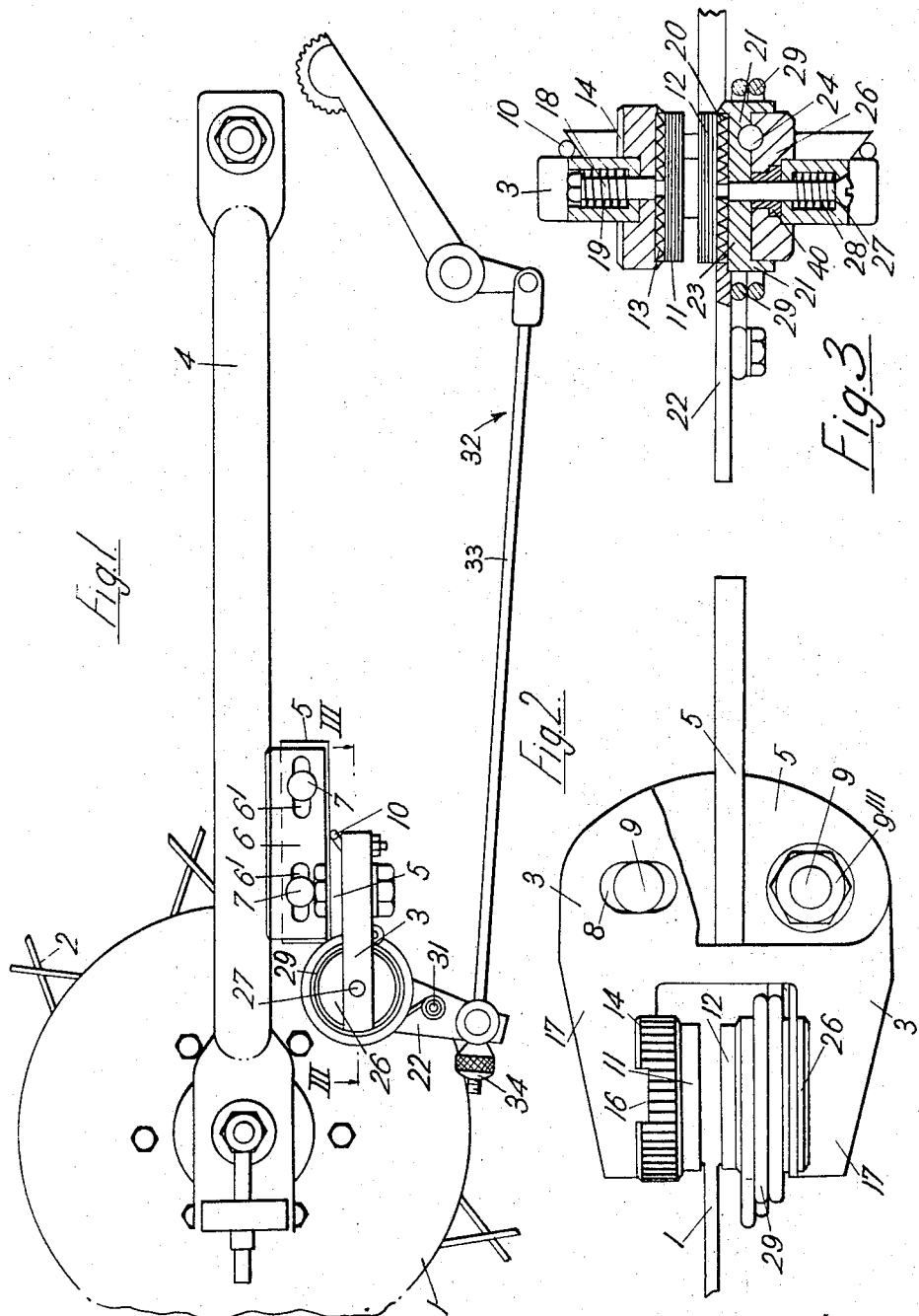

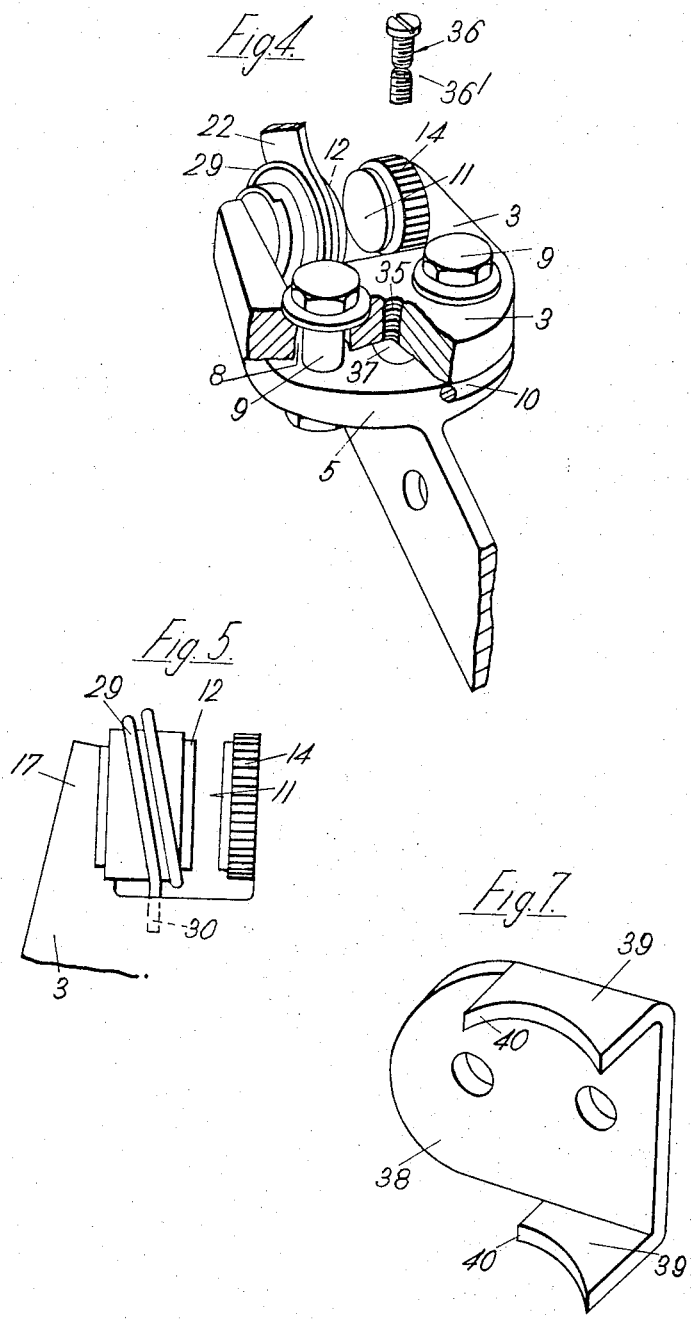

3,373,845
HIGH PERFORMANCE FRICTION DISC BRAKE
Tullio Campagnolo, Corso Padova 160,
Vicenza, Italy
Filed Sept. 7, 1965, Ser. No. 485,258
Claims priority, application Italy, Sept. 7, 1964,
50,973/64; July 29, 1965, 7,516/65
6 Claims. (Cl. 188—26)

ABSTRACT OF THE DISCLOSURE

A pair of friction pads, one stationary, the other rotatable, are mounted on opposite sides of a vehicle brake disc for common shifting transverse to the axis of the disc when the rotatable pad is actuated to grip the disc with the stationary pad, the angular movement of the rotatable pad being in the same direction as the disc to provide a servo action

---

This invention relates to a high performance friction disc brake for vehicles in general.

It is the object of this invention to improve the braking action obtainable from conventional disc brakes with the same surface of the friction pads and material used, without resorting to complicated and costly mechanical arrangements, but building up a simple and homogeneous structure.

It is still another object of this invention to provide a friction disc brake having a high compactness, good strength and endurance, which can be readily applied for each regulation, adjustment and adaptation to the use.

It is further another object of this invention to provide a friction disc brake having an easy, fast, gentle and safe control and a moderate cost.

Although it is designed for use on any vehicle type whatever, the friction disc brake according to the present invention lends itself particularly well to the application on motorcycles and the like, the invention also relating to the brackets for fitting of the brake on the front fork and rear portion of the frame of a motorcycle.

Substantially, the friction disc brake according to the present invention is of the type comprising a disc fixed to the vehicle wheel and a caliper body mounted astride the disc allowing of limited displacement with respect to the disc axis and provided with a pair of friction pads having the axis being in common parallel to that of the disc, one of which is stationary whilst the other one is movable to engage the disc under the control of actuating means and thus to move the caliper body relative to a connecting plate of the brake, so that said caliper body also causes the stationary pad to engage the disc to obtain the braking. This brake is characterized in that the motion by which the movable friction pad approaches the disc and causes its engagement in the braking is an helical motion consisting of a translation according to the axis of the pad and a rotation around said axis in the same rotating direction as the disc when the vehicle is in motion. The motion of the movable friction pad, controlled against the action of return spring means, is preferably obtained so that the reaction to the braking stress exerted by it in use directly unloads onto the same means controlling the helical motion, whilst the stationary friction pad may take on the caliper body via the rotation of its support different positions in each of which it has a different play relative to the movable pad.

As mentioned above, the brake according to the present invention lends itself particularly well for use on light vehicles such as motor cycles and motorscooters, and is preferably executed in the mechanically operated version. In a preferred non-limiting embodiment designed for application on the wheel of a motor vehicle, the motion of the caliper body of the brake is locked during the mounting stage by a screw being screwed into a threaded hole of the body itself and projecting therefrom to engage a special seat of the connecting plate, so as to fix the mutual position between the caliper body and the connecting plate and to facilitate therefore the correct mounting of the brake relative to the disc on the vehicle frame.

Other features and advantages of the invention will become apparent to all those skilled in the art from the following detailed description of an embodiment taken in conjunction with the accompanying drawings, in which:

FIG. 1 is a side view in small scale of the brake according to this invention fitted to the rear wheel of a motorcycle;

FIG. 2 is a plan view in a larger scale of the same brake with its parts removed;

FIG. 3 is a section taken along the line III—III in FIG. 1;

FIG. 4 illustrates substantially in the same scale as for FIGS. 2 and 3 and in a perspective view the brake according to the present invention with some of its parts removed, showing the connecting arrangement of the connecting plate to the caliper body;

FIG. 5 is a view of a detail of the brake of FIG. 4;

FIG. 6 is an exploded perspective view of the brake according to the present invention; and FIG. 7 is a perspective view in enlarged scale of the bracket for fastening the brake to the front fork of a motorcycle or the like.

The brake comprises a disc 1 which is illustrated only in FIG. 1, fastened to the hub of a motorcycle wheel, provided with spokes 2, and a caliper body 3 supported by the rear portion or fork 4 of the motorcycle. The caliper body 3 is arranged astride the disc 1 and carried by a connecting plate 5 to be rigidly fastened to the flange 6 of the fork 4 by means of bolts 7. The caliper body 3 is connected to the plate 5 so as to accomplish limited displacements parallel to the axis of the disc 1. To this aim (see FIGS. 2 and 6), the caliper body 3 has two oblong holes 8 in the direction of the axis of the disc, whilst the connecting plate 5 carries two corresponding plain circular holes 5'. The bolts 9 pass with their entire plain portion 9' through the holes 8 and project over the surface of the plate 5 when it is associated with the caliper body, engaging with their threaded portion 9" the holes 5' of the plate 5 to be finally locked by the nuts 9'''. The distance between the surface of the plate and the surface of the caliper body facing each other is therefore fixed and established so that a ring seal 10 is elastically seal-tightened between the plain periphery of the caliper body 3 and the strongly tapered periphery 5" (FIG. 6) of the connecting plate 5. Under these conditions, mutual motion between the plate and the caliper body is obtained without difficulty and is facilitated still further if the air gap between both members is filled with grease. The position of the caliper body in relation to the disc may be adjusted by means of the slots 6' of the flange 6 as will be described hereinbelow.

Leaning out of the periphery of the disc 1, on the one and the other side thereof, the caliper body 3 carries two stationary and movable friction pads 11 and 12, respectively. The stationary friction pad 11 (FIGS. 2, 3 and 6) is carried by a pad—holding plate 13 which is associated with an externally knurled bushing 14 inserting the teeth 13' of its periphery into corresponding seats 14' of the bushing 14. On the outer closed base of the bushing 14 are provided two grooves 15 and 16 arranged according to two diameters being perpendicular to each other and having different depths. With one of these grooves, having an equal width, the bushing 14 is fitted on one of the arms 17 of the caliper body 3 to which, via a screw 18 and a spring 19 both the bushing 14 and the plate 13 with the pad 11 remain yieldably anchored in a position fixed to the rotation. It is possible, nevertheless, by overcoming the strength exerted by the spring 19 by displacement of the bushing towards the disc and rotating consequently the knurled bushing 14, to have the other one of the two grooves 15, 16 cooperate with the arm 17 of the caliper body thereby obtaining a different position of the friction plane of the pad 11.

The movable friction pad 12 (FIGS. 3 and 6) is carried by a plate 20 similar to the plate 13, the teeth 20' of which insert into seats 21' of a bushing 21 made in one single piece with a control lever 22. The bushing 21 carries in a center diaphragm 23 on the side opposite the plate 20 three hemispherical seats receiving so many balls 24 capable to cooperate with conical seats 25 of a support 26 acting as a pin for the bushing 23 and mounted stationary on the arm 17 opposite that previously mentioned of the caliper body 3. The friction pad 12, the plate 20 for the same and the bushing 21 with the balls 24 are held yieldably anchored to said arm of the caliper body 23 by a screw 27, which passes through a small bush 40 in support 26, and a spring 28 which tends to maintain the pad 12 away from the disc. The same action is accomplished by a coil spring 29 winding externally to the bushing 21.

The mounting of this coil spring 29 is illustrated clearly in FIG. 5, showing that it has one of its ends 30 inserted into a seat of the caliper body 3 and the other end 31 (see also FIGS. 1 and 6) hooked and stopped by a screw on the control lever 22 of the brake. The spring 29 has its own end inserted into the seat of the caliper body instead of being straight, strongly angled to the outside of the brake, so that when it is mounted in the seat (which is straight and normal to the axis of the pads) the whole spring tilts to the outside as may be seen in FIG. 3 in order to also return axially the pad 12 to its rest position, once the braking control action on the lever 22 terminates.

The brake control occurs by traction of the lever 22, for example by a tie rod 33 of a control leverage 32 the threaded end of which is made integral with the lever 22 by means of a knurled nut 34 with possibility of adjustment.

The adjustment of the caliper body relative to the disc in the mounting of the brake on the motorcycle is carried out easily and safely thanks to the presence of a locking system between the caliper body and connecting plate. According to said locking system, between the oblong holes 8 (see FIGS. 4 and 6) of the caliper body is obtained according to the present invention a threaded hole 35 in which a screw 36 may be screwed. When the brake is in centered position, the hole 35 has its own center at the center of a conical cavity 37 provided in turn on the connecting plate 5. As illustrated in the figure, the screw 36 is of adequate length to ensure the locking, when it is fully screwed in, of the caliper body 3 on the plate 5. Under these conditions, the mounting of the brake on the motorcycle or other vehicle may be carried out safely and its correct centering on the disc will be obtained. Once the mounting has been arranged, the operator has to remove the screw 36 and to break it at its notch 36' (FIG. 4) in order to use it as cap for the grease contained in the air gap provided between the caliper body and the plate, leaving the caliper 3 free to move relative to the plate 5 (which is now fastened (FIG. 1) to the flange 6) and relative to the disc in the braking.

FIG. 7 represents in a perspective view a bracket for the fastening of the connecting plate of the brake to the front fork of a motorcycle. This bracket comprises a flat body 38 with the ends 39 folded over according to a right angle and terminating with arcuated parts 40 adapting to the shape of the fork to which they should be welded. On the same motorcycle the brake is instead fastened at the rear wheel as shown in FIG. 1 by using the flange 6 having a rectangular shape welded to the rear portion of the frame or fork 4. The welding of the brackets is carried out with the brackets already secured by means of bolts to the connecting plate of the brake, the latter being in turn locked to the caliper body by means of the screw 36. In the operation, when the tie rod 33 displaces the lever 22, the bushing 21 is forced to rotate and the balls 24 are caused to go up the conical ramps 25 thus displacing the same bushing 21 towards the disc 1. The movable pad 12 displaces, therefore, to the disc with a helical motion consisting of a translation motion according to the axis of the disc 1 produced by the displacement of the balls 24 and a rotary motion imparted to the plate 20 by the bushing 21. Upon engagement of the disc a displacement of the caliper body 3 relative to the disc 1 takes place, bringing also the pad 11 into engagement with the disc itself for the braking. It is important to note that the pad 12 engages the disc 1 rotating in the same rotating direction of the disc. This produces a screwing effect and a consequent wedging which considerably increases the intensity of the engagement between the pad 12 and the disc 1 with great advantage in the braking. This self-locking effect permits with the same results either to reduce the surface of the friction pads or to execute these from material having smaller friction but being of longer endurance (most hard), or to ensure better reuslts if the dimensional and material characteristics of the conventional brakes are retained. For the adjustment of the brake other than on the knurled nut 35 of the leverages 32 one may act on the knurled bushing 14 by bringing the groove 16, which is less deep than 15 into engagement with the arm 17 of the caliper body 3 at the moment when wear appeared.

In this manner, the pad 11 considerably approaches the pad 12.

The presence of the seal 10 ensures a perfect tightness against dust for the mounting of the caliper body relative to the connecting plate 5. The movements of the caliper 3 relative to the plate 5 are correctly guaranteed by the particular mounting described and made easy and gentle by the presence of grease between both parts and the seal 10.

The simple and compact shape of the brake, its safety and tested effectiveness make it a means of high performance for the use in vehicles having to give high services and particularly in sport and competition vehicles.

Although the detailed description of the brake according to the present invention has been generally referred to a brake for motorcycles, it is clear that nothing is objected to the application of the same brake to other vehicle types, particularly to motorcars and the like.

It is understood that other embodiments of the brake according to the present invention could be developed, which could also be executed with hydraulic operation by bringing about suitable modifications to the control system of the bushing 21.

What I claim is:

1. In a vehicle brake of the disc type comprising a caliper body having a first friction pad supported thereon in fixed relation thereto, a second friction pad supported on the caliper body in axial alignment with the first friction pad and spaced therefrom, means for mounting the caliper body on a vehicle to position said friction pads on opposite sides of a brake disc of a vehicle wheel, said mounting also including means for slidable movement of the caliper body in a direction parallel with the axis of rotation of a brake disc, said means for mounting the caliper body including a member to be attached to a vehicle, means for adjustably attaching the caliper body to said member, said caliper body being provided with a threaded opening, said member being provided with an opening in alignment with said threaded opening when the caliper body is located at a predetermined initial position, and a threaded bolt received through said second opening and threaded into said first opening to temporarily secure the caliper body in said initial position, the support means for the second friction pad including an element to which the second friction pad is fixedly secured and including means for supporting said element for axial and rotational movement with respect to the caliper body and concentric with the axis of the first friction pad, actuating means including axial camming means for said element, said camming means being arranged for movement of said element toward the first friction pad when said element is rotated in the same direction as the direction of rotation of a brake disc.

2. The invention as defined in claim 1, wherein said bolt is provided with a zone of reduced diameter located medially of its length, whereby said bolt may be broken into two portions, the upper portion of the bolt providing a removable cap for said second opening.

3. The invention as defined in claim 1, wherein the lower end of said second opening is provided with a conical annual recess to provide a chamber for lubricant.

4. In a vehicle brake of the disc type comprising a caliper body having a first friction pad supported thereon in fixed relation thereto, a second friction pad supported on the caliper body in axial alignment with the first friction pad and spaced therefrom, means for mounting the caliper body on a vehicle to position said friction pads on opposite sides of a brake disc of a vehicle wheel, said mounting also including means for slidable movement of the caliper body in a direction parallel with the axis of rotation of a brake disc, the support means for the first friction pad including a cylindrical member having a knurled peripheral surface, said first friction pad being attached to one face of the cylindrical member, the opposite face being provided with a plurality of diametrical grooves of varying axial depths, a diametrically extending element for engagement with any one of said grooves to position to first friction pad in different axial locations, and means for yieldably axially urging said cylindrical member into operative engagement with said diametrically extending element, the support means for the second friction pad including an element to which the second friction pad is fixedly secured and including means for supporting said element for axial and rotational movement with respect to the caliper body and concentric with the axis of the first friction pad, actuating means including axial camming means for said element, said camming means being arranged for movement of said element toward the first friction pad when said element is rotated in the same direction as the direction of rotation of a brake disc.

5. In a vehicle brake of the disc type comprising a caliper body having a first friction pad supported thereon in fixed relation thereto, a second friction pad supported on the caliper body in axial alignment with the first friction pad and spaced therefrom, means for mounting the caliper body on a vehicle to position said friction pads on opposite sides of a brake disc of a vehicle wheel, said mounting also including means for slidable movement of the caliper body in a direction parallel with the axis of rotation of a brake disc, the support means for the second friction pad including an element to which the second friction pad is fixedly secured and including means for supporting said element for axial and rotational movement with respect to the caliper body and concentric with the axis of the first friction pad, actuating means including axial camming means for said element, said camming means for said element of the second friction pad including at least two relatively movable parts, one of said parts being a plate having a radially extending control lever, the other of said parts being a cylindrical bushing, said two parts being mounted for relative rotation with respect to each other about the axis of the cylindrical bushing, one of said two parts being provided with a plurality of arcuate axially sloping seats, a ball positioned in each of the seats for moving the second friction pad axially toward the brake disc when rotated in said same direction, and biassing means for urging rotation of the second friction pad in the opposite direction, said biassing means including a coil spring surrounding said plate, one end of the spring being turned radially inward and received within an opening provided in the caliper body, the other end of the spring being secured to the lever.

6. In a vehicle brake of the disc type comprising a caliper body having a first friction pad supported thereon in fixed relation thereto, a second friction pad supported on the caliper body in axial alignment with the first friction pad and spaced therefrom, means for mounting the caliper body on a vehicle to position said friction pads on opposite sides of a brake disc of a vehicle wheel, said mounting also including means for slidable movement of the caliper body in a direction parallel with the axis of rotation of a brake disc, said means for mounting the caliper body including a flat plate having a chamfered edge, said caliper body having a flat surface for relative slidably engagement with the flat plate, a pair of bolts threadedly secured at one of said two aforementioned elements, the other of said elements being provided with slotted openings through which said bolts pass, and elastic seal means disposed between said flat plate and caliper body, the support means for the second friction pad including an element to which the second friction pad is fixedly secured and including means for supporting said element for axial and rotational movement with respect to the caliper body and concentric with the axis of the first friction pad, actuating means including axial camming means for said element, said camming means being arranged for movement of said element toward the first friction pad when said element is rotated in the same direction as the direction of rotation of a brake disc.

References Cited

UNITED STATES PATENTS

| | | | |
|---|---|---|---|
| 3,052,326 | 9/1962 | Baisch | 188—73 |
| 3,062,329 | 11/1962 | Erickson | 188—73 |
| 3,155,195 | 11/1964 | Brawerman | 188—73 |
| 3,285,372 | 11/1966 | Rossmann | 188—73 |

FOREIGN PATENTS

| | | |
|---|---|---|
| 1,145,844 | 10/1957 | France. |
| 1,273,257 | 11/1959 | France. |

MILTON BUCHLER, *Primary Examiner.*

B. S. MOWRY, T. W. BUCKMAN, *Assistant Examiners.*